United States Patent [19]

Shieh et al.

[11] Patent Number: 5,539,052
[45] Date of Patent: Jul. 23, 1996

[54] CROSSLINKED THERMOPLASTIC ELASTOMERS

[75] Inventors: Tsu-chia Shieh, Framingham; William A. Nicoll, Shrewsbury, both of Mass.

[73] Assignee: Surprenant Cable Corp., Clinton, Mass.

[21] Appl. No.: 382,978

[22] Filed: Feb. 3, 1995

[51] Int. Cl.$^6$ ................ C08L 23/26; C08L 9/06
[52] U.S. Cl. ............ 525/92 R; 525/98; 525/194; 525/198; 525/326.3; 525/177; 525/184; 525/342
[58] Field of Search .................. 525/92 R, 194, 525/98, 198, 326.3, 342, 184, 177

[56] References Cited

U.S. PATENT DOCUMENTS 5,159,016  10/1992  Inoue ........................... 525/92

FOREIGN PATENT DOCUMENTS

| 1004781 | 1/1986 | Japan . |
| 1313547 | 12/1989 | Japan . |
| 4025520 | 1/1992 | Japan . |

*Primary Examiner*—Juna Jewel
*Assistant Examiner*—I. Zemel
*Attorney, Agent, or Firm*—Hayes, Soloway, Hennessey, Grossman & Hage

[57] ABSTRACT

A crosslinked thermoplastic elastomer blend prepared by the process comprising blending together:

(a) a thermoplastic resin containing at least three alternating blocks:

$$A_x\text{—}B\text{—}A_x$$

wherein A is a block of at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

$$\text{—}C(R_3)(R_4)\text{—}C(R_5)\text{=}C(R_6)\text{—}C(R_7)(R_8)\text{—}$$

wherein $R_3$–$R_8$ are each a hydrogen or an alkyl group, or mixtures thereof;

(b) a thermoplastic polymer resin or mixture of thermoplastic resins; and (c) a crosslinking agent which develops crosslinking as between components (a) and (b) characterized in that the blend exhibits subsequent to crosslinking an elongation of less than 100% under stress of 100 psi at 200° C.

51 Claims, No Drawings

CROSSLINKED THERMOPLASTIC ELASTOMERS

BACKGROUND OF THE INVENTION

1. Field of the Invention

The present invention relates to a crosslinked thermoplastic elastomer blend composition superior in the balance of rigidity, impact resistance and processability, and in particular, resistance to elevated temperatures and the ability to maintain a significant percentage of its tensile strength, and elongation, upon exposure to heat. In particular, the present invention is directed to the preparation of a crosslinked thermoplastic elastomer blend formulation which is suitable for use in either an electrical insulating or tubing and hosing application, and which displays unexpectedly high resistance to heat aging and/or flame, good chemical resistance as well as possessing highly satisfactory strength characteristics over a broad temperature range.

2. Description of Prior Art

There remains a continuous demand, especially in the electronics industry, for thin-wall, truly low-cost wire or cable insulation exhibiting high electrical integrity and good physical properties. Towards this end, two specific resins, poly(tetrafluorethylene) and crosslinked polyethylene, have been popularized (along with numerous others, e.g. fluorinated ethylene-propylene resins and ethylene/tetrafluoroethylene copolymers) which when used alone, or combined (i.e. layered) exhibit many of the desired properties for an insulation application. See, e.g. U.S. Pat. No. 3,546,014.

That is, recognizing the virtues of both polyethylene and fluorocarbon type polymers, electrical insulation materials have been developed that combine both a polyolefin and a fluoropolymer to prepare a composite electrical insulating material with advantageous performance. For example, in U.S. Pat. No. 3,269,862, it was reported that polyolefins such as polyethylene are excellent insulating materials for electrical wires, electric components and the like. However, the excellent dielectric properties of polyolefins were said to be offset by the relatively low melting points and their low resistance to flame and oxidation. It was, therefore, pointed out that considerable efforts had been directed to developing polyolefin formulations which were not subject to such deficiencies. Accordingly, the relatively low melting point of polyethylene was reportedly improved by crosslinking, e.g., by irradiation or chemical means. In addition, it was further found that certain additives will flame retard polyethylene. However, many flame retardant additives adversely affect the dielectric properties of polyolefins as well as low temperature performance and corrosion resistance. The '862 disclosure went on to report, therefore, a composite electrical insulating material comprising a crosslinked polyolefin layer and a crosslinked polyvinylidene fluoride layer which in combination possessed a high degree of flame resistance and a high degree of resistance to heat aging and high strength characteristics over a broad temperature range. The composite electrical insulating material disclosed therein was found useful for insulating electrical wire and electrical components with excellent dielectric properties with respect to the coated wire substrate.

Building on the concept of a crosslinked polyolefin base layer, followed by a fluoropolymer outer coating, wherein the low melting point and low resistance to flame and oxidation of the polyethylene layer is compensated by crosslinking the polyethylene and coating with a fluoropolymer, a variety of disclosures have been made for producing materials suitable for insulation of wires and electronic components and reference is made to the following U.S. Pat. Nos.: 3,763,222, 3,840,619, 3,894,118, 3,911,192, 3,970,770, 3,985,716, 3,995,091, 4,031,167, 4,155,823 and 4,353,961.

In addition, and of more recent report, is U.S. Pat. No. 5,281,766 which describes lead wire for use in motors, coils and transformers, covered first with a layer of a primary insulation material including a crosslinked polyolefin followed by a second insulating jacket comprising the specific fluoropolymer: poly(vinylidene fluoride) or a poly(vinylidene fluoride) copolymer.

Accordingly, with the long-standing emphasis on a fluoropolymer type insulation, the long-standing question became whether or not such relatively expensive fluoropolymer systems could be replaced by a different thermoplastic resin composition which could be crosslinked to a desired level, without sacrificing properties, particularly the balance of tensile strength and elongation, subsequent to standard heat aging requirements for insulative materials. That being the case, a review of the prior art was conducted to ascertain what types of disclosures had been made with respect to crosslinked thermoplastic resin compositions that might be suitable for replacement of the previously described fluoropolymer materials.

For example, in U.S. Pat. No. 5,248,729, there is described a thermoplastic resin composition prepared by heat treating and crosslinking a mixture comprising (a) a thermoplastic resin containing no olefinic unsaturation and (b) an elastomer having an olefinic unsaturated carbon-carbon bond, for example, styrene-butadiene-styrene block copolymer. In particular, a dihydroaromatic compound was used as the crosslinking agent in crosslinking a mixture of a saturated thermoplastic resin and an unsaturated elastomer. The crosslinking was said to proceed only within the unsaturated component, with no substantial change of the saturated thermoplastic resin. The produced compositions were said to be superior in the balance of rigidity, impact resistance and moldability.

In U.S. Pat. No. 5,149,895, there is described a vulcanizable liquid composition which comprises a styrene-diene-styrene block copolymer, which is then crosslinked to provide a vulcanizable composition. The polymers produced were said to have high elongation and excellent aging characteristics.

U.S. Pat. No. 5,093,423 described a method for making styrene-butadiene thermoplastic elastomers. Specifically, the dynamic vulcanization of the styrene-butadiene elastomer is reported, along with a co-continuous matrix of styrene-ethylene-butadiene-styrene block copolymer and polypropylene. The dynamic vulcanization step is indicated to take place under appropriate conditions of sheer and temperature. Compositions of superior properties were reported to be achieved using this particular method.

U.S. Pat. No. 4,927,882 describes a styrene-butadiene thermoplastic elastomer which is said to be produced by dynamic vulcanization of the styrene-butadiene component.

U.S. Pat. No. 4,371,663 describes certain styrene polymer/thermoplastic elastomer blends made by melt-blending of styrene polymers and thermoplastic elastomers followed by a heat initiated crosslinking reaction along with the use of organic peroxides. Noteworthy improvements in ESCR, tensile strength, and practical toughness were said to be among significant physical properties improved in such polyblends.

Finally, it should be noted that previous work known to the present inventors related to blending together styreneethylene-butylene-styrene block copolymers and high and low density polyethylenes, in the presence of a crosslinking agent, followed by crosslinking to low levels of crosslink density. That is, these formulations contained a crosslinking density below that of the present invention and without the unexpected properties now claimed.

In sum, therefore, all of the above formulations were said to improve certain specific mechanical properties of the resulting materials, but none reported on the development of high levels crosslinking, or relative high thermoset character, while at the same time maintaining requisite flexibility for a wire coating, tubing or hosing application. That is, none of the prior art formulations described above report on material systems that can be made thermoset to a desired degree, without sacrificing the combined critical performance characteristics necessary for an insulating material: high tensile strength, sufficient flexibility and thermostability. In short, the prior art has not been totally successful in preparing a crosslinked thermoplastic elastomer suitable to replace some of the more expensive materials used in the insulated wire tubing or hosing industries.

Accordingly, it is an object of this invention to provide a crosslinked thermoplastic elastomer which is suitable for use as an insulating layer in the wire coating industry and which is useful in other applications where high tensile strength and flexibility are required, such as cable jackets, tubing and hosing.

More particularly, it is an object of the present invention to crosslink thermoplastic elastomer block copolymers, wherein the crosslinking is carried out to a level wherein flexibility is uniquely and surprisingly preserved, high tensile strength is maintained, and wherein both the tensile strength and flexibility remain in the crosslinked resin subsequent to long-term thermal aging.

Finally, it is a more specific object of the present invention to develop a high tensile strength yet flexible wire coating, tubing and hosing material stable to long term heat aging suitable for wire insulating applications, by the process of blending a thermoplastic elastomer block copolymer with a thermoplastic polymer resin, and crosslinking, wherein crosslinking is specifically developed as between the thermoplastic elastomer and thermoplastic polymer resin, at a desired level, optionally in the presence of a crosslinking promoter, along with incorporation of antioxidants and heat stabilizers.

SUMMARY OF THE INVENTION

A crosslinked thermoplastic elastomer blend prepared by the process comprising blending together:

(a) a thermoplastic resin containing at least three alternating blocks:

$$A_x\text{—}B_y\text{—}A_x$$

wherein A is a block of at least one polymerized unsaturated ethylene monomer of the following formula:

$$\text{—CH}_2\text{—C(R}_1\text{)(R}_2\text{)—}$$

wherein $R_1$ and $R_2$ are each a hydrogen, alkyl or aromatic group, provided that when one of $R_1$ or $R_2$ is a hydrogen or an alkyl group, the other R group is an aromatic group and wherein B is a block of a polymer or copolymer containing at least one conjugated diene monomer in polymerized form, having at least four (4) carbon atoms and the following formula for the residual double bond in the diene after polymerization:

$$\text{—C(R}_3\text{)(R}_4\text{)—C(}_5\text{)=C(R}_6\text{)—C(R}_7\text{)(R}_8\text{)—}$$

wherein $R_3$-$R_8$ are each a hydrogen or an alkyl group, or mixtures thereof; and (b) a thermoplastic polymer resin or mixture of thermoplastic resins;

(c) a crosslinking agent which develops crosslinking as between components (a) and (b) characterized in that the blend subsequent to crosslinking exhibits an elongation of less than 100% under stress of 100 psi at 200° C.

DETAILED DESCRIPTION OF THE PRESENT INVENTION

The present invention comprises a variety of different formulations which have been found, as noted above, suitable for use in electrical insulation applications or tubing or hosing applications, and which can be made thermoset to a desired degree, to provide good tensile strength, but which at the same time remain flexible, and which can be made thermally stable. The details of these formulations are described in the following embodiments.

In a first embodiment, the present invention can be described as a crosslinked thermoplastic elastomer blend prepared by the process comprising blending together:

(a) a thermoplastic resin containing at least three alternating blocks:

$$A_x\text{—}B_y\text{—}A_x$$

wherein A is a block of at least one polymerized unsaturated ethylene monomer of the following formula:

$$\text{—CH}_2\text{—C(R}_1\text{)(R}_2\text{)—}$$

wherein $R_1$ and $R_2$ are each a hydrogen, alkyl or aromatic group, provided that when one of $R_1$ or $R_2$ is a hydrogen or an alkyl group, the other R group is an aromatic group and wherein B is a block of a polymer or copolymer containing at least one conjugated diene monomer in polymerized form, having at least four (4) carbon atoms and the following formula for the residual double bond in the diene after polymerization:

$$\text{—C(R}_3\text{)(R}_4\text{)—C(}_5\text{)=C(R}_6\text{)—C(R}_7\text{)(R}_8\text{)—}$$

wherein $R_3$-$R_8$ are each a hydrogen or an alkyl group, or mixtures thereof; and (b) a thermoplastic polymer resin or mixture of thermoplastic resins;

(c) a crosslinking agent which develops crosslinking as between components (a) and (b) characterized in that the blend subsequent to crosslinking exhibits an elongation of less than 100% under stress of 100 psi at 200° C. (the details of this mechanical behavior performance value is explained more fully in connection with the working examples.) More preferably, the blend exhibits an elongation of less than 90%, 80%, 70%, 60%, 50% or 40%, under stress of 100 psi at 200° C. In a most preferred embodiment the blend exhibits an elongation of between 0–40%, again, under stress of 100 psi at 200° C.

In addition the above formulation can also have a 100% Modulus value of less than 1600 psi (again the details of this mechanical behavior performance value is explained more fully in connection with the working examples), or values less than 1500 psi, 1400 psi, 1300 psi, and 1200 psi.

In a second embodiment, the present invention can be described as a crosslinked thermoplastic elastomer blend prepared by the process comprising blending together:

(a) a thermoplastic resin containing at least three alternating blocks:

$$A_x\text{—}B\text{—}A_x$$

wherein A is a block of at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

$$\text{—}C(R_3)(R_4)\text{—}C(R_5)\text{=}C(R_6)\text{—}C(R_7)(R_8)\text{—}$$

wherein $R_3$–$R_8$ are each a hydrogen or an alkyl group, or mixtures thereof;

(b) a thermoplastic polymer or mixture of thermoplastic polymers; and (c) crosslinking components (a) and (b) upon exposure to gamma ray, or electron beam irradiation, characterized in that the blend exhibits an elongation of less than 100% under stress of 100 psi at 200° C. More preferably, this blend formulation exhibits elongations of less than 90%, 80%, 70%, 60%, 50% or 40% under stress of 100 psi at 200° C. In a most preferred embodiment the blend exhibits an elongation of between 0–40%, again, under stress of 100 psi at 200° C.

In a third embodiment, the present invention can be described as a crosslinked thermoplastic elastomer blend prepared by the process comprising blending together:

(a) a thermoplastic resin containing at least three alternating blocks:

$$A_x\text{—}B\text{—}A_x$$

wherein A is a block of at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

$$\text{—}C(R_3)(R_4)\text{—}C(R_5)\text{=}C(R_6)\text{—}C(R_7)(R_8)\text{—}$$

wherein $R_3$–$R_8$ are each a hydrogen or an alkyl group, or mixtures thereof;

(b) a thermoplastic polymer or mixture of thermoplastic polymers; and (c) crosslinking components (a) and (b) upon exposure to gamma ray, or electron beam irradiation. This formulation is characterized as having a 100% Modulus value of less than 1600 psi, or values less than 1500 psi, 1400 psi, 1300 psi, or 1200 psi.

In a still further embodiment, the present invention can be described as a crosslinked thermoplastic elastomer prepared by the process comprising (a) supplying a thermoplastic resin containing at least three alternating blocks:

$$A_x\text{—}B_y\text{—}A_x$$

wherein A is a block of at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

$$\text{—}C(R_3)(R_4)\text{—}C(R_5)\text{=}C(R_6)\text{—}C(R_7)(R_8)\text{—}$$

wherein $R_3$–$R_8$ are each a hydrogen or an alkyl group, or mixtures thereof; and (b) crosslinking upon exposure to gamma ray or electron beam irradiation, characterized in that the crosslinked elastomer exhibits an elongation of less than 100% under stress of 100 psi at 200° C. More preferably, the blend exhibits elongations of less than 90%, 80%, 70%, 60%, 50%, 40%, or 0–40%, under stress of 100 psi at 200° C.

In still another embodiment, the present invention comprises a crosslinked thermoplastic elastomer prepared by the process comprising (a) supplying a thermoplastic resin containing at least three alternating blocks:

$$A_x\text{—}B\text{—}A_x$$

wherein A is a block of at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

$$\text{—}C(R_3)(R_4)\text{—}C(R_5)\text{=}C(R_6)\text{—}C(R_7)(R_8)\text{—}$$

wherein $R_3$–$R_8$ are each a hydrogen or an alkyl group, or mixtures thereof;

(b) crosslinking components upon exposure to gamma ray, or electron beam irradiation. In addition, this formulation is characterized as having a 100% Modulus value of less than 1600 psi, or values less than 1500 psi, 1400 psi, 1300 psi or 1200 psi.

Finally, in another embodiment, the present invention is a crosslinked thermoplastic elastomer prepared by the process comprising blending together (a) a thermoplastic elastomer resin containing at least three alternating blocks:

$$A_x\text{—}B_y\text{—}A_x$$

wherein A is a block containing at least one polymerized unsaturated ethylene monomer of the following formula:

$$\text{—}CH_2\text{—}C(R_1)(R_2)\text{—}$$

wherein $R_1$ and $R_2$ are each a hydrogen, alkyl or aromatic group, provided that when one of $R_1$ or $R_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization;

$$\text{—}C(R_3)(R_4)\text{—}C(R_5)\text{=}C(R_6)\text{—}C(R_7)(R_8)\text{—}$$

wherein $R_3$-$R_8$ are each a hydrogen or alkyl group, or mixtures thereof;

(b) a crosslinking agent which develops crosslinking in (a) characterized in that subsequent to crosslinking the crosslinked elastomer exhibits an elongation of less than 100% under stress of 100 psi at 200° C. More preferably, the blend exhibits elongations of less than 90%, 80%, 70%, 60%, 50%, 40%, or 0–40%, under the stress of 100 psi at 200° C.

In addition, the above embodiment can have a 100% Modulus value of less than 1600 psi, or values less than 1500 psi, 1400 psi, 1300 psi, or 1200 psi.

With respect to the above formulations, it has been found that component (a) is preferably selected from the group consisting of styrene-ethylene-butylene-styrene copolymer, styrene-ethylene-butadiene copolymer, styrene-butadiene-styrene copolymer, styrene-isoprene-styrene copolymer, and mixtures thereof. The thermoplastic component (b) is preferably selected from the group consisting of polyethylene, poly(propylene), ethylene-propylene copolymers, ethylene-propylene-diene terpolymer, ethylene-octene copolymers, ethylene-butene copolymers, ethylene-unsaturated carboxylate copolymers, polystyrene, polyacrylonitrile, poly(alkyl alkylacrylate), polyamides, polyesters, and mixtures thereof.

In addition, prior to crosslinking, the above formulations which recite the use of a crosslinking component as component (c) preferably contain as the component a crosslinking agent containing at least one allyl or vinyl group, selected from the groups consisting of esters of methacrylic acid, polyfunctional vinyl monomers, and mixtures thereof. Preferably, the crosslinking agent is triallyl isocyanurate, triallylcyanurate, trimethylpropane trimethacrylate, decamethylene glycol dimethacrylate, divinylbenzene, diallylphthalate or mixtures thereof. Alternatively, the crosslinking agent can be a compound which generates free radicals upon exposure to heat, preferably of which is a peroxide type compound.

The crosslinking agent is preferably present at a concentration of at least one part of crosslinking agent to 100 parts of resin components (a) and (b). More preferably, the crosslinking agent is present at a concentration of about 1–50 parts per 100 parts of resin components (a) and (b), most preferably 10–20 parts. In addition, all of the above crosslinking agents were found to develop crosslinking as between components (a) and (b) upon activation by heat, gamma ray or electron beam irradiation. Finally, it is noted that crosslinking can be developed upon exposure to moisture. Towards this end, vinyl silane compounds can be utilized, in particular, a vinyl triethoxy silane.

In connection with all of the above recited blends, it has been found advantageous, depending upon the particular application, to incorporate certain additives into the inventive formulations.

In particular, it has been found advantageous to incorporate heat stabilizers and antioxidants, either alone or in combination. Preferred heat stabilizers are those selected from the group of compounds known as the zinc-mercapto heat stabilizers. Preferred antioxidants are those selected from the group consisting of hindered phenols, hindered aromatic amines, and mixtures thereof.

With respect to the above, it has been found that when both an antioxidant and heat stabilizer are incorporated into the various formulations, followed by crosslinking, a thermal aging performance is achieved. Typically 7–8 parts of heat stabilizer, and 6–8 parts of antioxidant, per 100 parts resin, are employed. That is, the amount of additive is such that the crosslinked blends retain about 80% of their tensile strength after 7 days' exposure at 180° C.

In addition, flame retardants such as antimony or zinc oxide, alone with halogen based flame retardants, such as decabromodiphenyl oxide can be incorporated into the blends. Moreover, metal deactivators can be readily compounded in the formulations, e.g., hydrazide compounds.

With respect to the above crosslinked blends, the degree of crosslinking is conveniently monitored by measurement of certain physical properties, which is best explained with reference to the following non-limiting working examples.

EXAMPLE I

A styrene-ethylene-butylene-styrene block copolymer (KRATON G 1651) 50% by weight was combined (melt compounding) with an ethylene-octene-copolymer (50% by weight) along with TMPTMA. The amount of TMPTMA was about 15 parts per 100 parts by weight of the two aforementioned copolymer resin components. Subsequent to irradiation crosslinking of 25 megarads the blend formulation indicated a tensile strength of about 2230 psi and elongation of about 310%.

EXAMPLE II

A styrene-ethylene-butylene-styrene block copolymer (KRATON G 1651, 67% by weight) and an ethylene-propylene-diene terpolymer (33% by weight) were combined with TMPTMA (12 parts per 100 parts by weight of resin). Subsequent to melt compounding the blend was crosslinked upon exposure to 20 megarads irradiation.

EXAMPLE III

A styrene-ethylene-butylene-styrene copolymer (KRATON G 1651, 75% by weight) was combined with an ethylene-vinyl acetate copolymer (25% by weight) along with TMPTMA (7 parts per 100 parts by weight of resin). Subsequent to melt compounding the formulation was crosslinked by radiation of 40 megarads.

EXAMPLE IV

A styrene-ethylene-butylene-styrene block copolymer (KRATON G 1651, 40% by weight) was blended with an ethylene-octene copolymer (40% by weight) along with an ethylene-vinyl acetate copolymer (20% by weight). This resin combination was then combined with TMPTMA (15 parts per 100 parts by weight of resin) and crosslinked by irradiation of 20 megarads.

EXAMPLE V

A styrene-ethylene-butylene-styrene block copolymer (67% by weight) was combined with an ethylene-octene copolymer (33% by weight) followed by the incorporation of TMPTMA at 13 parts per 100 weight of resin subsequent to melt compounding the blend was irradiation crosslinked with 20 megarads.

EXAMPLE VI

A styrene-ethylene-butylene-styrene copolymer was mixed with TMPTMA at 20 parts per 100 parts by weight of copolymer and crosslinked by irradiation of 7 megarads.

EXAMPLE VII

A styrene-ethylene-butylene-styrene block copolymer (67% by weight) was mixed with an ethylene-octene copolymer (33% by weight) and TMPTMA (11 parts by weight of resin). Subsequent to melt compounding the formulation was irradiated with 20 megarads.

EXAMPLE VIII

A styrene-ethylene-butylene-styrene block copolymer (55% by weight, a polyethylene (35% by weight) and an EPDM (10% by weight) were combined with TMPTMA (7.5 parts by weight of resin). Subsequent to melt compounding the blend was irradiation crosslinked with 15 megarads.

EXAMPLE IX

A styrene-ethylene-butylene-styrene block copolymer (67% by weight) was mixed with a polyethylene (33% by weight) and TMPTMA (6 parts by weight of resin). Subsequent to melt compounding the formulation was irradiated with 20 megarads.

EXAMPLE X

A styrene-ethylene-butylene-styrene block copolymer (33% by weight) and an ethylene-octene copolymer (67% by weight) were mixed with TMPTMA (12 parts by weight of resin). Subsequent to melt compounding the blend was irradiated with 20 megarads.

PROPERTIES OF BLEND FORMULATIONS

The above blend formulations were further mixed with antioxidant and heat stabilizer compounds wherein the amount of antioxidant and the amount of heat stabilizer were both incorporated at a level of about 7% by weight. The anti-oxidant was a hindered phenol compound, specifically IRGANOX 1010, and the heat stabilizer was a zinc mercapto compound. These particular additives were combined in the melt compounding step. Subsequent to irradiation crosslinking, all of these blends demonstrated their ability to retain at least 80% of their original tensile strength and elongation after seven days at 180° C. and showed no appreciable embrittlement after seven days at 200° C. in air. In addition, it was found that by increasing the amount of TMPTMA and the irradiation dose, the blend of Example II became very resistant to hot oil (e.g. 150° C. and ASTM No. 2 oil) and hot sharp chisel (e.g. 1 mil chisel with 500 gram weight at 250° C.).

HOT MODULUS AND 100% MODULUS AT ROOM TEMPERATURE

A first convenient way to demonstrate the degree of crosslinking of the above-referenced blends is to expose the material to tensile stress at a temperature above its melting point. In this invention, we subject test specimens to 100 psi stress at 200° C., determine the resulting deformation and compute what is referred to as the "Hot Modulus".

Specifically, a cut dumbbell or insulating tubing whose cross section has been determined is annealed in 200° C. oven for two minutes, removed, cooled to room temperature and applied with bench marks of 1 inch. The specimen suspended vertically in a 200° C. oven is attached a weight equivalent to 100 psi. The specimen is allowed to remain in the oven for about 15 minutes. The weighted specimen is then carefully removed from the oven and allowed to cool to room temperature. The weight is removed and the distance between the bench marks is measured. Hot Modulus is defined as a percent of the increase in distance between the bench marks over the original 1 inch distance.

A convenient way of expressing flexibility of the crosslinked thermoplastic elastomer blends is to measure the stress required to elongate 100% of the material at room temperature. This is referred to as the "100% Modulus".

Specifically, a cut dumbbell or insulation tubing whose cross section has been determined is applied with bench marks of 1 inch. The specimen is subjected to a tensile and elongation test on a tensile tester, such as Instron. The load that is required to elongate the bench marks to 2 inches is determined. 100% Modulus (psi) is defined by dividing the load (pound) by the cross section (square inch) of the specimen.

In the context of the present invention, wherein a crosslinked thermoplastic material has been produced having utility as wire/cable insulation, and as a resin for a tubing or hose application, it has been found that the Hot Modulus value is under 100%, preferably under 90%, more preferably under 80%, and in a most preferred embodiment under 70%. Alternatively, the resins of the present invention can be characterized as having 100% Modulus values of less than 1600 psi, preferably under 1500 psi, more preferably under 1400 psi, and in a most preferred embodiment under 1200 psi.

In addition to the above, the following properties of the blend formulations in the previously mentioned examples were determined:

| | Properties of Blend Formulation | | | |
|---|---|---|---|---|
| Example | Tensile Strength (psi) | Elongation (%) | Hot Modulus (200° C./100 psi) (%) | 100% Modulus (psi) |
| I | 2230 | 310 | 25.3 | 1150 |
| II | 2620 | 270 | 25.0 | 1300 |
| III | 1750 | 150 | 18.1 | 1450 |
| IV | 2420 | 240 | 32.4 | 1500 |
| V | 2300 | 250 | 34.8 | 1500 |

-continued

| | Properties of Blend Formulation | | | |
|---|---|---|---|---|
| Example | Tensile Strength (psi) | Elongation (%) | Hot Modulus (200° C./100 psi) (%) | 100% Modulus (psi) |
| VI | 2700 | 290 | 24.2 | 1160 |
| VII | 1980 | 230 | 42.6 | 1440 |
| VIII | 2230 | 275 | 89.8 | 1400 |
| IX | 2250 | 220 | 70.3 | 1430 |
| X | 2400 | 330 | 57.2 | 1400 |

As can be seen from the above, the crosslinked thermoplastic blends of the present invention are characterized in that the blends can exhibit an elongation of less than 100% under a stress of 100 psi at 200° C. In addition, the blends can exhibit a 100% modulus of less than 1600 psi at room temperature.

We claim:

1. A crosslinked thermoplastic elastomer blend prepared by the process comprising blending together:

(a) a thermoplastic elastomer resin containing at least three alternating blocks:

A—B—A wherein A is a block containing at least one polymerized unsaturated ethylene monomer of the following formula:

—CH$_2$—C(R$_1$)(R$_2$)— wherein R$_1$ and R$_2$ are each a hydrogen, alkyl or aromatic group, provided that when one of R$_1$ or R$_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization;

—C(R$_3$)(R$_4$)—C(R$_5$)=C(R$_6$)—C(R$_7$)(R$_8$)— wherein R$_3$–R$_8$ are each a hydrogen or alkyl group, or mixtures thereof;

(b) a thermoplastic polymer resin or mixture of thermoplastic resins;

(c) a crosslinking agent which develops crosslinking as between components (a) and (b);

characterized in that the blend subsequent to crosslinking exhibits an elongation of less than 100% under stress of 100 psi at 200° C.

2. The crosslinked thermoplastic elastomer blend of claim 1 characterized in that the blend exhibits an elongation of less than 90% under stress of 100 psi at 200° C.

3. The crosslinked thermoplastic elastomer blend of claim 1 characterized in that the blend exhibits an elongation of less than 80% under stress of 100 psi at 200° C.

4. The crosslinked thermoplastic elastomer blend of claim 1 characterized in that the blend exhibits an elongation of less than 70% under stress of 100 psi at 200° C.

5. The crosslinked thermoplastic elastomer blend of claim 1 characterized in that the blend exhibits an elongation of less than 60% under stress of 100 psi at 200° C.

6. The crosslinked thermoplastic elastomer blend of claim 1 characterized in that the blend exhibits an elongation of less than 50% under stress of 100 psi at 200° C.

7. The crosslinked thermoplastic elastomer blend of claim 1 characterized in that the blend exhibits an elongation of less than 40% under stress of 100 psi at 200° C.

8. The crosslinked thermoplastic elastomer blend of claim 1 characterized in that the blend exhibits an elongation of 0–40% under stress of 100 psi at 200° C.

9. The crosslinked thermoplastic elastomer blend of claim 1 characterized in that the blend exhibits a 100% Modulus of less than 1600 psi at room temperature.

10. The crosslinked thermoplastic elastomer blend of claim 1 characterized in that the blend exhibits at 100% Modulus of less than 1500 psi at room temperature.

11. The crosslinked thermoplastic elastomer blend of claim 1 characterized in that the blend exhibits at 100% Modulus of less than 1400 psi at room temperature.

12. The crosslinked thermoplastic elastomer blend of claim 1 characterized in that the blend exhibits at 100% Modulus of less than 1300 psi at room temperature.

13. The crosslinked thermoplastic elastomer blend of claim 1 characterized in that the blend exhibits a 100% Modulus of less than 1200 psi at room temperature.

14. The crosslinked thermoplastic elastomer blend of claim 1 wherein component (a) is selected from the group consisting of styrene-ethylene-butylene-styrene copolymer, styrene-ethylene-butadiene copolymer, styrene-butadiene-styrene copolymer, styrene-isoprene-styrene copolymer, and mixtures thereof.

15. The crosslinked thermoplastic elastomer blend of claim 1 wherein component (b) is selected from the group consisting of polyethylene, poly(propylene), ethylene-propylene copolymers, ethylene-octene copolymers, ethylene-butene copolymers, ethylene-unsaturated carboxylate copolymers, polystyrene, polyacrylonitrile, poly(alkyl alkylacrylate), polyamides, polyesters, and mixtures thereof.

16. The crosslinked thermoplastic elastomer blend of claim 1 wherein the crosslinking agent contains at least one allyl or vinyl group selected from the group consisting of esters of methacrylic acid, polyfunctional vinyl monomers, and mixtures thereof.

17. The crosslinked thermoplastic elastomer blend of claim 16 wherein the crosslinking agent is triallyl isocyanurate, triallylcyanurate, trimethylpropane trimethacrylate, decamethylene glycol dimethacrylate, divinylbenzene, diallylphthalate or mixtures thereof.

18. The crosslinked thermoplastic elastomer blend of claim 1 wherein the crosslinking agent is a compound which generates free-radicals upon exposure to heat.

19. The crosslinked thermoplastic elastomer blend of claim 18 wherein the crosslinking agent is a peroxide.

20. The crosslinked thermoplastic elastomer blend of claim 17 wherein the crosslinking agent is present at a concentration of at least 1 part of crosslinking agent per 100 parts of resin components (a) and (b).

21. The crosslinked thermoplastic elastomer blend of claim 20 wherein the crosslinking agent is present at a concentration of about 1–50 parts per 100 parts of resin components (a) and (b).

22. The crosslinked thermoplastic elastomer blend of claim 1 wherein the crosslinking agent which develops crosslinking as between components (a) and (b) is activated to crosslink said components by gamma ray, electron beam irradiation, heat or moisture.

23. The crosslinked thermoplastic elastomer blend of claim 1 wherein the crosslinking agent is a vinyl silane compound.

24. The crosslinked thermoplastic elastomer blend of claim 23 wherein the crosslinking agent is vinyl triethoxy silane.

25. The crosslinked thermoplastic elastomer blend of claim 1 further containing a heat stabilizer.

26. The crosslinked thermoplastic elastomer blend of claim 25, wherein the heat stabilizer is a zinc-mercapto compound.

27. The crosslinked thermoplastic elastomer blend of claim 1 further containing an antioxidant.

28. The crosslinked thermoplastic elastomer blend of claim 27 wherein the antioxidant is selected from the group consisting of hindered phenols, hindered aromatic amines, and mixtures thereof.

29. The crosslinked thermoplastic elastomer blend of claim 1, further containing both a heat stabilizer and an antioxidant.

30. The crosslinked thermoplastic elastomer blend of claim 29 wherein the crosslinked blend retains about 80% of its tensile strength after 7 days exposure to 180° C. in air.

31. A crosslinked thermoplastic elastomer blend prepared by the process comprising blending together:

(a) a thermoplastic resin containing at least three alternating blocks:

A—B—A wherein A is a block of at least one polymerized unsaturated ethylene monomer of the following formula:

—CH$_2$—C(R$_1$)(R$_2$)— wherein R$_1$ and R$_2$ are each a hydrogen, alkyl or aromatic group, provided that when one of R$_1$ or R$_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

—C(R$_3$)(R$_4$)—C(R$_5$)=C(R$_6$)—C(R$_7$)(R$_8$)— wherein R$_3$–R$_8$ are each a hydrogen or an alkyl group, or mixtures thereof;

(b) a thermoplastic polymer or mixture of thermoplastic polymers; and (c) crosslinking components (a) and (b) upon exposure to gamma ray, or electron beam irradiation characterized in that the crosslinked blend exhibits an elongation of less than 100% under stress of 100 psi at 200° C.

32. The crosslinked thermoplastic elastomer blend of claim 31 characterized in that the blend exhibits an elongation of less than 90% under stress of 100 psi at 200° C.

33. The crosslinked thermoplastic elastomer blend of claim 31 characterized in that the blend exhibits an elongation of less than 80% under stress of 100 psi at 200° C.

34. The crosslinked thermoplastic elastomer blend of claim 31 characterized in that the blend exhibits an elongation of less than 70% under stress of 100 psi at 200° C.

35. The crosslinked thermoplastic elastomer blend of claim 31 characterized in that the blend exhibits an elongation of less than 60% under stress of 100 psi at 200° C.

36. The crosslinked thermoplastic elastomer blend of claim 31 characterized in that the blend exhibits an elongation of less than 50% under stress of 100 psi at 200° C.

37. The crosslinked thermoplastic elastomer blend of claim 31 characterized in that the blend exhibits an elongation of less than 0–40% under stress of 100 psi at 200° C.

38. The crosslinked thermoplastic elastomer blend of claim 31 wherein component (a) is selected from the group consisting of styrene-ethylene-butylene-styrene copolymer, styrene-ethylene-butadiene copolymer, styrene-butadiene-styrene copolymer, styrene-isoprene-styrene copolymer, and mixtures thereof.

39. The crosslinked thermoplastic elastomer blend of claim 31 wherein component (b) is selected from the group consisting of polyethylene, poly(propylene), ethylene-propylene copolymers, ethylene-octene copolymers, ethylene-butene copolymers, ethylene-unsaturated carboxylate copolymers, polystyrene, polyacrylonitrile, poly(alkyl alkylacrylate), polyamides, polyesters, and mixtures thereof.

40. The crosslinked thermoplastic elastomer blend of claim 31, further containing a heat stabilizer.

41. The crosslinked thermoplastic elastomer blend of claim 40, wherein the heat stabilizer is a zinc mercapto compound.

42. The crosslinked thermoplastic elastomer blend of claim 31 further containing an antioxidant.

43. The crosslinked thermoplastic elastomer blend of claim 42, wherein the antioxidant is selected from the group consisting of hindered phenols, hindered aromatic amines, and mixtures thereof.

44. The crosslinked thermoplastic elastomer blend of claim 43, further containing both a heat stabilizer and an antioxidant.

45. The crosslinked thermoplastic elastomer blend of claim 44, wherein the crosslinked blend retains about 80% of its tensile strength after 7 days' exposure to 180° C. in air.

46. A crosslinked thermoplastic elastomer blend prepared by the process comprising blending together:

(a) a thermoplastic resin containing at least three alternating blocks:

A—B—A wherein A is a block of at least one polymerized unsaturated ethylene monomer of the following formula:

—CH$_2$—C(R$_1$)(R$_2$)— wherein R$_1$ and R$_2$ are each a hydrogen, alkyl or aromatic group, provided that when one of R$_1$ or R$_2$ is a hydrogen or an alkyl group, the other R group is an aromatic group; and wherein B is a block of a polymer or copolymer containing at least one conjugated diene monomer in polymerized form, having at least four (4) carbon atoms and the following formula for the residual double bond in the diene after polymerization:

—C(R$_3$)(R$_4$)—C(R$_5$)=C(R$_6$)—C(R$_7$)(R$_8$)— wherein R$_3$–R$_8$ are each a hydrogen or an alkyl group, or mixtures thereof;

(b) a thermoplastic polymer or mixture of thermoplastic polymers; and (c) crosslinking components (a) and (b) upon exposure to gamma ray, or electron beam irradiation.

47. The crosslinked thermoplastic elastomer blend of claim 46 characterized in that the blend exhibits at 100% Modulus of less than 1600 psi at room temperature.

48. The crosslinked thermoplastic elastomer blend of claim 46 characterized in that the blend exhibits at 100% Modulus of less than 1500 psi at room temperature.

49. The crosslinked thermoplastic elastomer blend of claim 46 characterized in that the blend exhibits a 100% Modulus of less than 1400 psi at room temperature.

50. The crosslinked thermoplastic elastomer blend of claim 46 characterized in that the blend exhibits a 100% Modulus of less than 1300 psi at room temperature.

51. The crosslinked thermoplastic elastomer blend of claim 46 characterized in that the blend exhibits at 100% Modulus of less than 1200 psi at room temperature.

* * * * *